United States Patent Office 3,321,380
Patented May 23, 1967

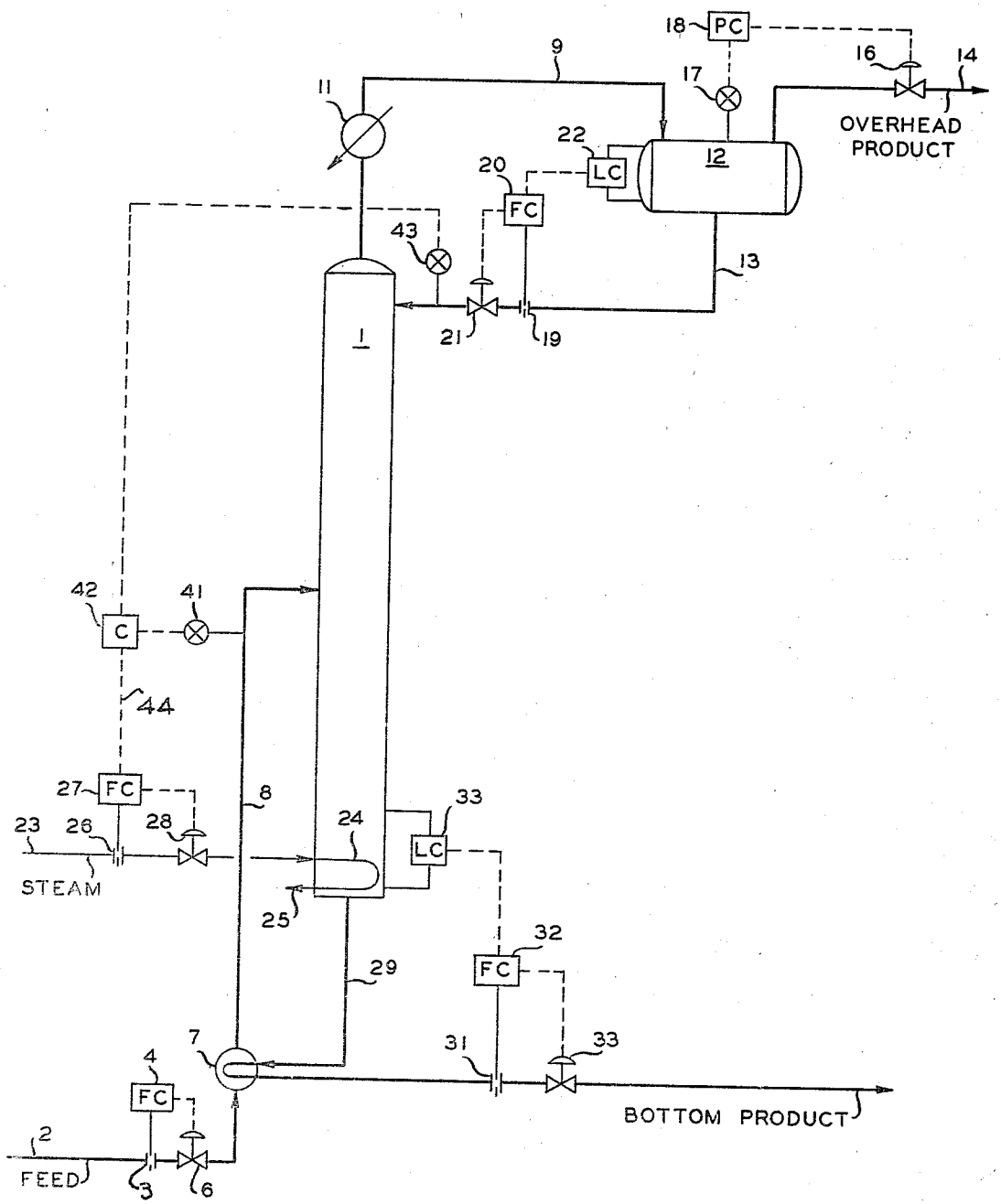

3,321,380
CONTROLLING THE HEAT INPUT TO A DISTILLATION COLUMN IN RESPONSE TO TEMPERATURES IN THE SYSTEM
Thell L. Hilburn, Bartlesville, Okla., assignor to Phillips Petroleum Company, a corporation of Delaware
Filed Aug. 29, 1963, Ser. No. 305,406
3 Claims. (Cl. 203—2)

This invention relates to controlling the operation of a distillation column. In another aspect, it relates to a method and apparatus for controlling the operation of a distillation column, whose overhead vapors are partially condensed, to economically produce a bottom product of desired specification, notwithstanding fluctuations in the composition and temperature of the feedstock and the temperature and flowrate of the reflux.

There is ever-increasing activity in the art of fractional distillation to optimize the operation of a distillation column so that products with desired specifications can be produced for minimum operating costs at the column's optimum design value. Optimizing the operation of a distillation column is complicated, difficult and tricky because of the column's numerous degrees of freedom, which are characterized as independent input variables, some of which may be controllable (e.g., feed temperature and reboiler heat flow) and others of which may be uncontrollable (e.g., ambient temperature and feed composition). Many methods and means have been proposed, patented or used in an effort to reduce the column's degrees of freedom. Unfortunately, the expense of many of the process controllers recently developed for controlling the operation of a distillation column, such as feed enthalpy controllers and internal reflux controllers, cannot be justified for many distillation operations, such as certain deethanizer columns which are used to deethanize relatively small volumes of feedstocks.

Accordingly, an object of this invention is to improve the operation of a distillation column. Another object is to provide a method and means for controlling the operation of a distillation column, whose overhead vapors are partially condensed, to economically produce a bottom product of desired specification. Another object is to provide a method and means for controlling the heat input to a distillation column, whose feedstock is supplied at a constant flowrate and whose vapors are partially condensed, to produce a bottom product of desired specification, notwithstanding fluctuations in the temperature and composition of the feedstock and the temperature and flowrate of the reflux. Another object is to provide a method and means for controlling the operation of a distillation column to produce a deethanized product of desired specification. Other objects and advantages of this invention will become apparent to those skilled in the art from the following description, appended claims, and accompanying drawing in which the single figure schematically illustrates a distillation column provided with certain features of this invention.

Briefly, the subject invention provides an improved method and means for controlling a distillation column whose feedstock is supplied at a constant flowrate, whose overhead is partially condensed to provide liquid reflux and a vaporous overhead product, and whose feedstock temperature and composition and reflux temperature and flowrate are subject to fluctuations. According to this invention, the temperature of the feedstock and the temperature of the external reflux are measured, signals responsive to such measurements are produced, said signals are combined to produce a control signal inversely responsive to the sum of the temperature signals, and the heat supplied to the column is manipulated in response to said control signal, to maintain a predetermined or desired specification for the liquid bottom product withdrawn from the column.

Referring to the accompanying drawing, a fractional distillation column 1 is shown, which column can be provided with a plurality of the usual vertically-spaced liquid-vapor contact trays (not shown). Feed comprising a multi-component mixture to be separated is supplied via line 2, the flowrate thereof being maintained constant by a conventional assembly comprising orifice plate 3, flow controller 4 and flow control valve 6. Feed line 2 can be associated with the usual indirect heat exchanger(s) such as an economizer 7. The resulting heated feed is supplied via line 8 in its liquid, partially vaporized, or vaporized form to column 1 and is introduced on a feed tray thereof located at an intermediate level. Vapors are removed from the top of column 1 by an overhead line 9, passing through a cooler 11, such as an air-cooled condenser, to partially condense the vapors, the latter being passed to an accumulator 12. Liquid condensate or distillate in accumulator 12 is withdrawn therefrom and recycled via line 13 as external reflux to the top of column 1. Uncondensed overhead product is withdrawn from the top of accumulator 12 via line 14 having a flow control valve 16 therein. A constant pressure in the top of column 1 and accumulator 12 can be maintained by a conventional assembly comprising pressure transducer 17 and pressure controller 18, the latter serving to manipulate valve 16 in line 14. The flowrate of the external reflux in line 13 can be controlled by a conventional assembly comprising an orifice plate 19, flow controller 20 and flow control valve 21. The liquid level in accumulator 12 can, by means of liquid level controller 22, manipulate the setpoint of flow controller 20 in a conventional manner. Heat is supplied to the kettle of column 1 by the circulation of steam or other heat exchange medium from supply line 23 through reboiler coil 24, the heat exchange medium being withdrawn from the coil via line 25. The flowrate of the heat exchange medium in line 23 can be controlled by an assembly comprising orifice plate 26, flow controller 27 and flow control valve 28. Bottom product is withdrawn from the kettle of column 1 via line 29 and it can be passed in indirect heat exchange relationship through economizer 7 with the feed of line 2. The flowrate of the bottom product can be conventionally controlled by an assembly comprising orifice plate 31, flow controller 32 and flow control valve 33. The level of liquid in the kettle of column 1 can be used, by means of liquid level controller 33, to manipulate the setpoint of flow controller 32 in a conventional cascade fashion.

Thus far, there has been described a conventional distillation column whose overhead vapors are partially condensed and which is provided with minimum conventional controls to reduce the number of the degrees of freedom of the column. However, many input variables can still affect the operation of the column.

Fluctuations in the composition of the feedstock will also normally affect the operation of the column. For example, if the light components in the feed increase, the amount of overhead vapor which is condensed will increase, thereby increasing the flowrate of the external reflux and, where the bottom product is used to heat the feed in an economizer, the temperature of the feed will decrease due to a decreased flow rate of the bottom product. The operation can also be affected by fluctuations or changes in the temperature of the external reflux due to fluctuations in ambient temperature. This is especially true when an air-cooled condenser is used to condense the overhead vapors of the column. Ambient temperature changes, for example due to sudden rainstorms or dropping temperature at night, produce fluctuations in the reflux being returned to the top of the column. For example, if the external reflux temperature drops, this means that more of the vapors in the top of the column will be condensed, resulting in an increase in bottom product and an undesirable decrease in the purity thereof. Thus, it can be seen that fluctuations or changes in the temperature of the feedstock and in the temperature of the external reflux affect the liquid-vapor mass transfer taking place in the column and the specification of the bottom product.

The bottom product can be specified by specifying the fraction of a component therein, usually the fraction of the light key component (which is an impurity, expressed as a maximum). Whether a predetermined specification for the bottom product is met will depend on how efficiently the column is operated as uncontrollable variables fluctuate.

According to this invention, the temperature of the feedstock introduced into the column is sensed by a conventional temperature sensor 41, such as a thermocouple, and it is transmitted as a signal to a controller 42. Similarly, the temperature of the external reflux is sensed by a similar temperature sensor 43 and this temperature is also transmitted as a signal to controller 42. Signals responsive to the so-measured temperatures of the feed and external reflux are added or summed in controller 42 and a control signal inversely responsive to the sum of the two temperature signals is produced and is transmitted via signal line 44 to adjust the setpoint of flow controller 27. Such adjustment serves to manipulate the amount of heat supplied to the reboiler 24, i.e., the flowrate of steam in line 23, to maintain the predetermined specification of the bottom product, notwithstanding changes in the temperature and composition of the feed and the temperature and flowrate of the external reflux. A number of control instruments which can be used to perform the function of controller 42 are commercially available, for example that described as Model 68–1 in Bulletin AD–68, December 1955, of the Moore Products Co., Philadelphia, Pa.

As an example, column 1 of the drawing is a deethanizer column and is used during a certain period of operation to deethanize a feed whose composition changes, as shown in Table I.

TABLE I

| | Feed compositions, mol percent | | |
|---|---|---|---|
| | A | B | C |
| Hydrogen sulfide | 3.09 | 2.07 | 2.53 |
| Methane | 3.96 | 3.54 | 3.66 |
| Ethane | 18.90 | 14.80 | 16.70 |
| Propane | 43.00 | 36.00 | 39.50 |
| Isobutane | 4.15 | 4.36 | 4.15 |
| Normal butane | 14.06 | 20.68 | 17.60 |
| Isopentane | 3.12 | 4.60 | 3.92 |
| Normal pentane | 4.10 | 5.93 | 5.06 |
| Hexane | 3.27 | 4.71 | 4.02 |
| Heptane | 2.35 | 3.31 | 2.82 |

The column is operated with a top pressure of 480 p.s.i.a. and is provided with eleven theoretical trays. The feed is supplied at the constant flowrate of 672,000 gallons per day and the desired or predetermined specification of the deethanized kettle product is 1.5 mol percent or less of ethane.

During the first part of the operation, when the feed has composition A of Table I, temperature sensor 41 produces a signal representative of a feed temperature of 184° F., and temperature sensor 43 produces a signal representative of a reflux temperature of 84° F. These signals are added by controller 42 and a control signal inversely responsive to the sum of these signals is transmitted to flow controller 27 to maintain the flowrate of steam to the reboiler coil 24 at 340,500 pounds per day. In the next part of the operation the composition of the feed changes to that of composition B of Table I. Temperature sensor 41 produces a signal representative of feed temperature of 184° F. and temperature sensor 43 produces a signal representative of a reflux temperature of 88° F. Accordingly, these temperature signals are summed in controller 42 and the setpoint of flow controller 27 is adjusted by a corresponding control signal 44 to decrease the flowrate of steam supplied to reboiler coil 24 to 337,000 pounds per day, to maintain said predetermined specification for the bottom product. Next, the composition of the feed changes to that of composition C of Table I. Accordingly, temperature sensors 41 and 43 detect temperatures of 171° F. and 90° F., respectively. Accordingly, controller 42 manipulates the setpoint of flow controller 27 to change the amount of steam to reboiler coil 24 to 355,000 pounds per day and maintain said predetermined specification. In the next part of the operation, when the composition of the feed supplied to the column remains that of composition C of Table I, temperature sensor 41 indicates a feed temperature of 190° F. and temperature sensor 43 indicates a reflex temperature of 80° F. (due to a drop in ambient temperature occasioned by a sudden rain squall). Accordingly, these temperature signals are summed and controller 42 manipulates the setpoint of flow control 27 to change the amount of steam supplied to reboiler coil 24 to 338,000 pounds per day and maintain said predetermined specification. In another part of the operation, with the feed supplied to the column having composition C of Table I, a preheater is positioned in feed line 8, downstream of economizer 7, to provide further heat, using steam for this purpose. Accordingly, temperature sensor 41 produces a signal representative of said temperature of 179° F., while temperature sensor 43 produces a signal representative of the reflux temperature of 94° F. Accordingly, these temperature signals are summed to produce a control signal 44 which manipulates the setpoint of flow controller 27 to decrease the amount of heat supplied to the reboiler coil 24 to 338,500 pounds per day, and bottom product produced meets said predetermined specification.

Various modifications and alterations of this invention will become apparent to those skilled in the art from the foregoing description and accompanying drawing without departing from the scope and spirit of this invention, and it should be understood that this invention is not to be limited unduly to that set forth herein for illustrative purposes.

I claim:

1. A process for operation of a distillation column which comprises the steps of:
   (a) supplying a liquid feed to said column at a relatively constant flow rate;
   (b) supplying heat to said column to vaporize a portion of said feed;
   (c) withdrawing overhead vapor from said column, condensing a portion thereof, and passing resulting condensate to said column as reflux;
   (d) withdrawing a liquid bottoms product;
   (e) separately measuring the temperature of the reflux of step (c);
   (f) separately measuring the temperature of the feed of step (a);
   (g) summing the sensed temperatures of steps (e) and (f); and
   (h) varying the heat supplying in step (b) inversely as the sum in step (g) varies only to maintain a predetermined specification for said bottoms product.

2. Apparatus comprising in combination
   (1) a distillation column having a feed inlet, in an intermediate section, a vapor outlet in its top, a reboiler in its bottom section, a reflux inlet in its upper section, and a bottoms outlet for product;
   (2) a feed line connected with said feed inlet having constant flow control means therein;

(3) an accumulator connected with said vapor outlet by a first conduit having a condenser therein and with said reflux inlet with a second conduit having constant flow control means therein;

(4) individual temperature sensing means for sensing the reflux temperature and emitting a signal proportional to the sensed temperature;

(5) individual temperature sensing means for sensing the feed temperature and emitting a signal proportional to the sensed temperature;

(6) a withdrawal conduit connected with said bottoms outlet;

(7) a line for supplying a hot fluid to said reboiler having a motor valve therein with actuating means therefor; and (8) a controller connected with the temperature sensing means of (4) and (5) for receiving the emitted signals and emitting an output control signal to the actuating means of (7) which varies inversely as the sum of the said signals, only, to increase the supply of said hot fluid when the sum of the reflux and feed temperatures decreases and to decrease said supply when said sum increases.

3. The method of claim 1, wherein said bottom product is indirectly heat exchanged with said feed upstream of the temperature sensing point.

References Cited by the Examiner

UNITED STATES PATENTS

| | | | |
|---|---|---|---|
| 2,508,434 | 5/1950 | Storment | 202—206 X |
| 2,684,326 | 7/1954 | Boyd | 202—160 X |
| 2,939,293 | 6/1960 | Green | 62—21 |
| 3,158,556 | 11/1964 | Hopper | 202—160 |
| 3,203,871 | 8/1965 | Clark et al. | 202—206 X |
| 3,224,947 | 12/1965 | Lupfer | 202—206 |

NORMAN YUDKOFF, *Primary Examiner.*

WILBUR L. BASCOMB, JR., *Examiner.*